WEIGHT WATER VOPOR / WEIGHT DRY AIR
(WEIGHT TIMES FACTOR)

TEMPERATURE IN °C

INVENTOR
HENRI COANDA

Nov. 12, 1968   H. COANDA   3,410,758
WATER PURIFYING APPARATUS
Filed June 8, 1966   4 Sheets-Sheet 3

INVENTOR
HENRI COANDA
BY
Kane, Dalsimer, Kane & Smith
ATTORNEYS

Nov. 12, 1968  H. COANDA  3,410,758
WATER PURIFYING APPARATUS
Filed June 8, 1966  4 Sheets-Sheet 4

INVENTOR
HENRI COANDA
BY
Kane, Dalsimer, Kane & Smith
ATTORNEYS

United States Patent Office 3,410,758
Patented Nov. 12, 1968

3,410,758
WATER PURIFYING APPARATUS
Henri Coanda, Paris, France, assignor to Coanda Water Purifier Corporation, New York, N.Y., a corporation of Delaware
Filed June 8, 1966, Ser. No. 556,110
14 Claims. (Cl. 202—177)

ABSTRACT OF THE DISCLOSURE

An apparatus for transforming non-potable water to a potable state including structure whereby non-potable water at a temperature approaching the boiling point evaporates, due to an incremental increase in temperature, while flowing as a film on a surface heated by the heat of condensation to saturate a moving film contacting dry air mass at subatmospheric pressure and which subsequent air-vapor mixture is compressed then passed to a condensing surface contiguous with said evaporation surface to condense potable water for collection, with said condensing surface passing to the evaporating surface enough heat to cause the incremental increase in temperature of the non-potable water.

---

The present invention relates to the purification of water to a potable state and in particular to the method and apparatus which is employed. One important application of the apparatus is for the desalinization of water.

The apparatus operates in accordance with the principle that at various temperatures and pressures dry air is capable of holding, in suspension, varying amounts of water vapor. At any single temperature and pressure the amount of vapor that can be associated with air cannot exceed a set value. This is due to the fact that the partial pressure of the vapor cannot exceed the saturation tension for a given temperature.

Developing this further, the saturation point or dew point at different pressures varies widely within a temperature range encompassing those temperatures slightly below to those slightly above the boiling point of water at atmospheric pressure. In other words, the difference between the dew point for different pressure values is greater the closer the temperature is to the boiling point of water at atmospheric pressure, and either above or below this temperature.

Stating this by way of example, it is found that dry air, at a pressure of 684 mm. Hg (10% below atmospheric pressure or a value of 760 mm. of Hg) is capable of holding or associating with approximately 25 times its weight of water vapor at 96° C. It is also found that under the above temperature condition but subjecting the air to an elevated pressure of, as for example, 874 mm. Hg, dry air is capable of holding only about 2.5 times its weight of water vapor. Thus, at the elevated pressure the air is capable of holding only 10% of that vapor held at the lower pressure.

Therefore, if dry air, at the aforementioned sub-atmospheric pressure, is saturated with water vapor at 96° C. to form an air-vapor mixture and the mixture is then compressed to a value in excess of atmospheric pressure, as for example 874 mm. Hg, while maintaining or returning the temperature of the vapor to the initial 96° C., it will be possible to collect approximately 90% of the absorbed vapor content in the form of a pure water condensate.

The apparatus embodied in the present invention functions in accordance with this principle. The apparatus also functions so as to conserve energy and by the use of various heat transfer devices, heat is transferred from the water having been heated to untreated water thereby to provide the necessary calories required for the latter to pass into the vapor phase to produce the saturated air-vapor mixture.

It is an object of the present invention to provide an apparatus and method whereby non-potable, contaminated water may be transformed into a potable state.

It is also an object to provide such an apparatus with means in the form of heat exchangers efficiently to recover heat from one circuit of the apparatus and supply such heat to a second circuit thereby to cause evaporation of non-potable water.

It is a further object to provide a purification apparatus of relatively small size, of reduced cost so as to be adaptable for household usage, and of high efficiency.

Other objects and advantages of the present invention will readily come to mind as the following description is developed.

In a broad sense the invention is directed to the method of transforming a non-potable water to potable water and the apparatus to perform the method. The apparatus comprises a pumping system to circulate both untreated and treated water through the apparatus. A primary heat exchange means is disposed within the apparatus in a sealed enclosure that is maintained at a first pressure. The exchange means is provided with an outer surface adapted to be supplied with heat developed on the condensation of vapor within the exchanger thereby to vaporize a portion of untreated water circulated by said pumping system to said outer surface to saturate the dry air mass within the sealed enclosure. The apparatus also comprises means to compress the saturated air mass and supply the compressed mixture to the interior of said primary heat exchanger wherein the vapor condenses forming pure water to be collected with the heat of condensation being used to supply heat to said outer surface whereby a continuous evaporation-condensation cycle may be maintained.

The method generally comprises flowing a thin film of untreated water over an evaporation surface capable of being heated and disposed within a sealed enclosure under first pressure conditions, saturating a dry air mass within said enclosure and compressing said saturated mass to a second higher pressure; and thereafter, passing said compressed saturated mass into a heat exchanger wherein the mass strikes a relatively cooler surface causing the compressed vapor to condense in the form of pure water and transferring the heat release on condensation to said evaporation surface wherefrom untreated water vaporizes.

In the drawings which both illustrate and form a part of the present invention,

Figure 2:
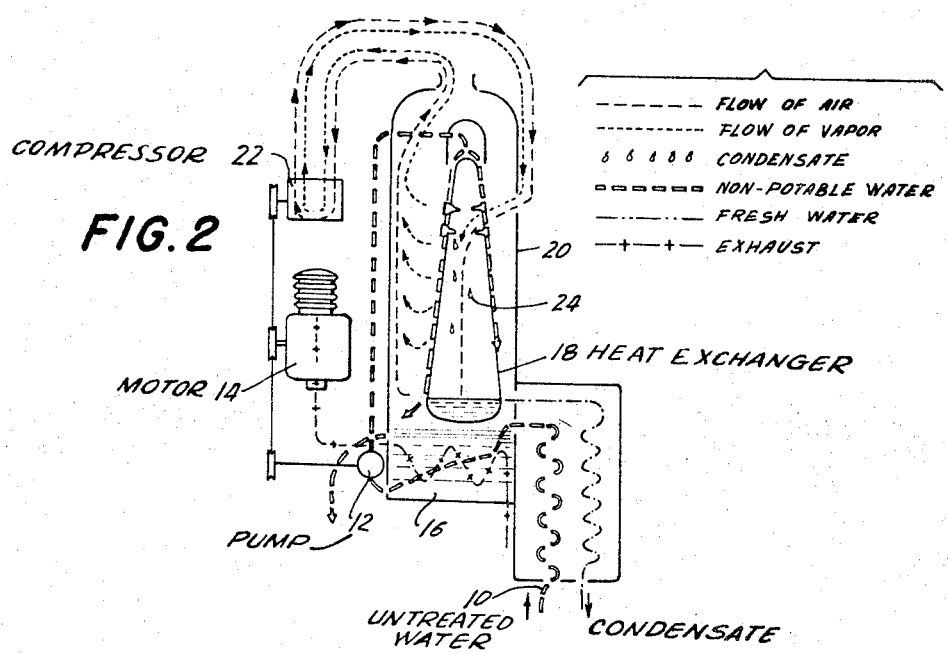
FIGURE 2 is a theoretical diagram, accompanied by a legend, of the air and water circulation taking place within the apparatus.

Before commencing upon a detailed discussion of the structural features together with the particular function and operation of the water purifying apparatus defining the present invention, reference may be had to FIG. 2 showing the overall operation of the unit as exemplified by the theoretical diagram. To aid in this discussion reference may also be had to the table that accompanies FIG. 2 and the graph shown in FIG. 3. As may be apparent, the graph depicts the capability of dry air to absorb and hold in suspension water vapor at various temperatures and under certain pressure conditions. Thus, the abscissa of the graph is representative of increasing temperature values in degrees centigrade and the ordinate of the graph is representative of a ratio of the weight of water vapor over the weight of dry air which allows a determination as to the amount of water vapor dry air, over and above its own weight, can suspend when at various temperatures and subjected to pressures represented by the family of pressure curves.

Briefly then, non-potable, contaminated water 10, which is to be treated, enters the apparatus in the direction of the arrow due to the action of pump 12. As is conventional, the pump is driven by motor 14. As schematically shown, the non-potable water (hereinafter referred to as untreated water) follows a path through a heat exchanger and is collected in container 16. To be more fully discussed, the untreated water is heated during said passage and further heated within the container by an auxiliary burner and/or the exhaust of motor 14. The untreated water, having its temperature raised to a temperature approximating 96° C., is then drawn from the container by a second pump. The untreated water is caused to flow to a position above a second heat exchanger 18. The untreated water, thereafter, filters through a unit in which certain constituents are caused to deposit and flows over the outer wall portion or evaporation surface of the exchanger. This flow is due to gravity. The particular construction and operation of heat exchanger 18 will be more fully discussed below.

The heat exchanger 18 is disposed within a chamber that is suitably maintained at sub-atmospheric pressure. Preferably this pressure is to be approximately 10% below atmospheric pressure and normally at about 684 mm. of Hg. The chamber is maintained at this point, or substantially thereabout, due to compressor operation. As the untreated water, at about 96° C., flows over the exchanger surface it is supplied with just enough heat to increase its temperature by a small increment. This incremental increase in temperature, while operating at the aforementioned pressure condition, causes a percentage of the untreated water to evaporate into the flowing air stream within the enclosure thereby creating a saturated air-vapor mixture. It is desirable that the percent of untreated water that evaporates be low. This reduces the deposition of brine that may occur on the evaporation surface and further, the quality of pure water derived is better.

As will also be more fully discussed, the additional heat or calories supplied to the untreated water to cause evaporation is derived from the heat released during condensation of the vapor within the compressed air vapor mixture. The condensation of pure water is carried out within the heat exchanger 18 and as noted in FIG. 3, approximately 9/10 of the vapor absorbed is released from suspension in the form of pure water condensation. By the unique construction of the exchanger, the heat release is efficiently transmitted through the wall of the exchanger upon which the untreated water is flowing.

Actually, upon compression the air-vapor mixture will undergo an increase in temperature. Therefore, maintaining high pressure and reducing temperature to about 96° C., as for example in the present case, contacting the compressed air-vapor mixture with relatively cooler walls of a heat exchanger, the mixture temperature will drop, water in a fresh, drinkable state will condense and the heat given up may be utilized to supply the necessary calories to cause untreated water to evaporate.

Continuing with the present brief discussion, the saturated air-vapor mixture within the chamber is drawn into a compressor 22. The compressor is driven by motor 14 and functions to compress the air-vapor mixture to a pressure in excess of atmospheric pressure. The compressed mixture is thereafter communicated to the interior of exchanger 18. As the relatively warmer compressed mixture (found to be approximately 103°–105° C.) strikes the cooler walls of the exchanger, the vapor condenses into droplets of fresh water 24 that are collected and drawn from the system.

By passing the compressed saturated mixture into the exchanger 18, the mixture will effectively be passing through a temperature gradient. The temperature at the top of the exchanger will be in excess of that temperature at the bottom. Therefore, the mixture will tend to condense and be re-evaportaed in the region near the top. This tendency reduces as the mixture film nears the bottom. Therefore, most of the condensate forms near the base of the exchanger and consequently most of the evaporation occurs in this region.

As discussedf, heat released upon condensation of fresh water is transmitted through the walls of the exchanger 18 to supply a small amount of additional heat to the untreated water flowing down the outer surface. This small amount of heat causes the untreated water to evaporate and pass into a vapor form.

The theoretical diagram finally indicates that the fresh potable water, hereinafter referred to as treated water, is passed from the apparatus for collection. This passage is through a third heat exchanger, wherein the treated water, at approximately 96° C., gives up heat to incoming untreated water to substantially raise the temperature of the latter. By proper choice of heat exchanger, the temperature differential between the treated water at the outlet and the untreated water at the inlet will be substantially negligible. Actually, it has been found to be about ½° C.

The apparatus is conveniently insulated so as to conserve heat and once the cyclical operation is commenced substantially all the heat generated is conserved. That little amount of heat that escapes is effectively balanced by the heat provided by the exhaust of motor 14.

Figure 1:
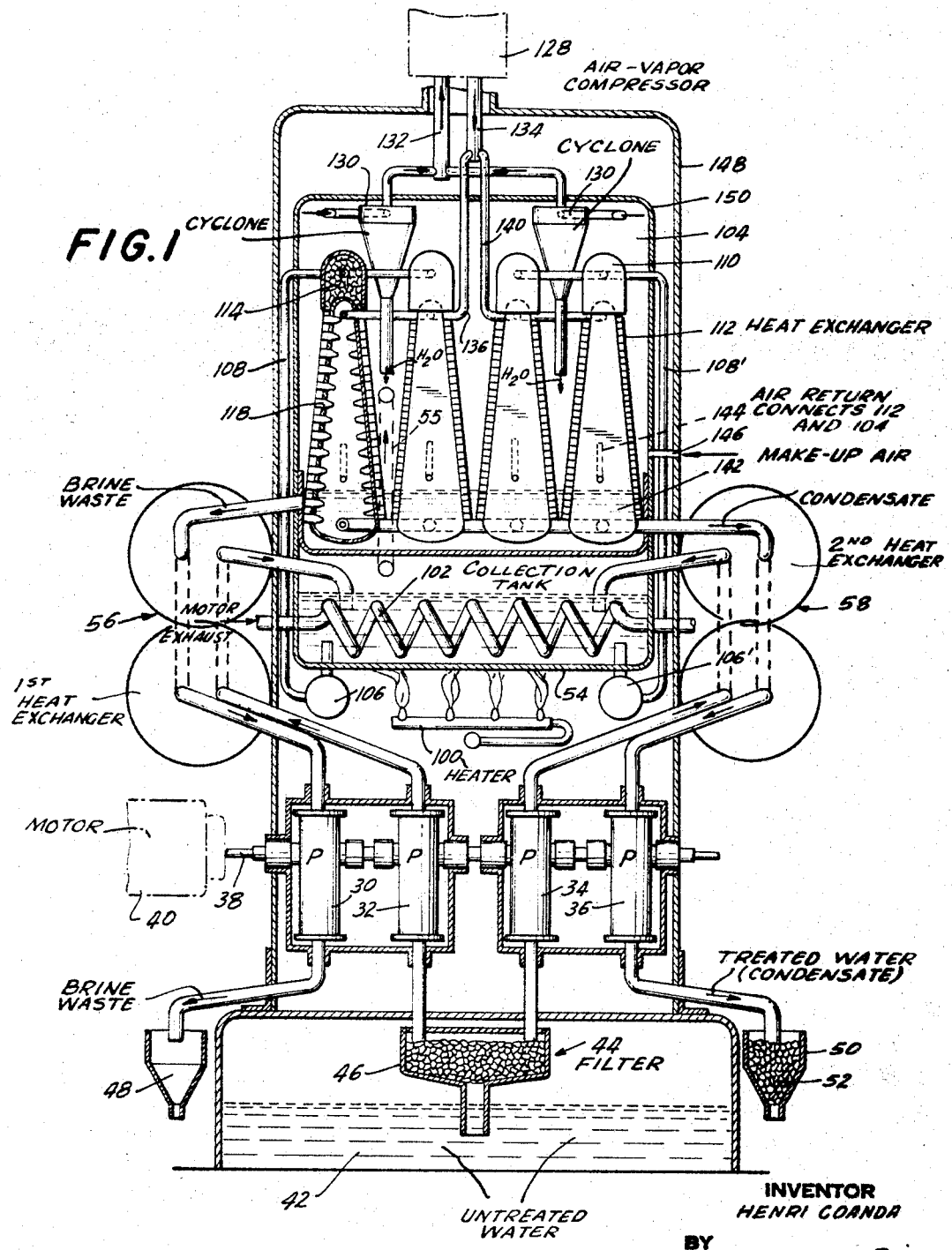
FIGURE 1 is an elevational view partially in section of the purifying apparatus.

Having the general operation in mind and appreciating the phenomena that the present invention utilizes it is now appropriate to more fully discuss the structural features of the apparatus and the preferred embodiment as seen in FIG. 1.

Thus, in the preferred embodiment there are provided two pairs of double acting pumps 30, 32 and 34, 36, respectively. These pumps are of general construction and operation and are arranged to be driven by a common drive shaft 38 of motor 40. Pumps 32 and 34 are mounted at the input of the system and operate to draw untreated water from a source through a primary filtration unit 44. The source is generally indicated at 42.

The filtration unit comprises a sealed enclosure 46 having lower portion in communication with the source. The enclosure is almost entirely filled gravel or other suitable substance capable of filtering particulate matter from the untreated water prior to being pumped through a pair of heat exchangers.

As will be brought out below, pumps 30 and 36, respectively, function to draw both untreated water, not evaporated, and treated water from the system. The latter pumps are in fluid connection with a pair of outlets 48 and 50. A quantity of activated charcoal 52 or other suitable material to provide further filtration of the treated water is disposed within outlet 50. This is conventional for it is known that activated carbon is capable of functioning to eliminate hydrocarbons which may be entrained in the treated water.

One additional word need be said about the double acting pumps. The pumps in each pair are of the same capacity so that they effectively circulate through the system, as nearly as possible, the same mass of liquid, i.e., the total mass of untreated water entering the system is substantially equal to the total mass of treated and untreated unevaporated water leaving the system. Thus, the total circulation through the system as a whole will remain constant. This may be accomplished by the use of rubber sleeving tubes, virtually without inertia, serving to regulate the intake and delivery of the pumps.

At the output of pumps 32, 34 and connecting the source 42 to a holding tank 54, the invention contemplates the use of heat exchangers 56 and 58. These are designated, respectively, as first and second heat exchangers. The exchangers 56 and 58, further, are of substantially identical construction and include a pair of interconnected sections 60 and 62. The particular construction is best seen in FIGS. 4–6.

As shown in the figures, the exchangers are formed from an elongated length of flat tubing 64 that is wrapped upon a support. The flow path is defined by pairs of flat tubes that are of greater thickness at the peripheral region than in the center. Thus, tubing sections 66 and 68 are joined by any suitable means at this peripheral region to form a central channel 70. Within the channel so as to provide a pair of flow passages is a thin metal sheet 72. The sheet is made of a material capable of providing good heat conduction from one side to the other. One such material may be pure aluminum. The periphery of the sheet is fixed intermediate the individual flat tubes 66 and 68 and carries a plurality of projections 74 to stabilize the sheet and maintain a proper orientation within the channel 70. The dimensions of the flow passages are relatively small so as to allow the passage of a liquid film.

The tubing is formed of a suitable insulating material, for example, rubber and may be extruded in a conventional manner. Whatever the material, it is necessary that it be of poor heat conduction capability so that all heat conduction is across the metal sheet. Since only a small quantity of liquid passes on opposed sides of the sheet and since the velocity of travel is slow and in opposite directions, the heat transfer is highly efficient.

Figure 4:
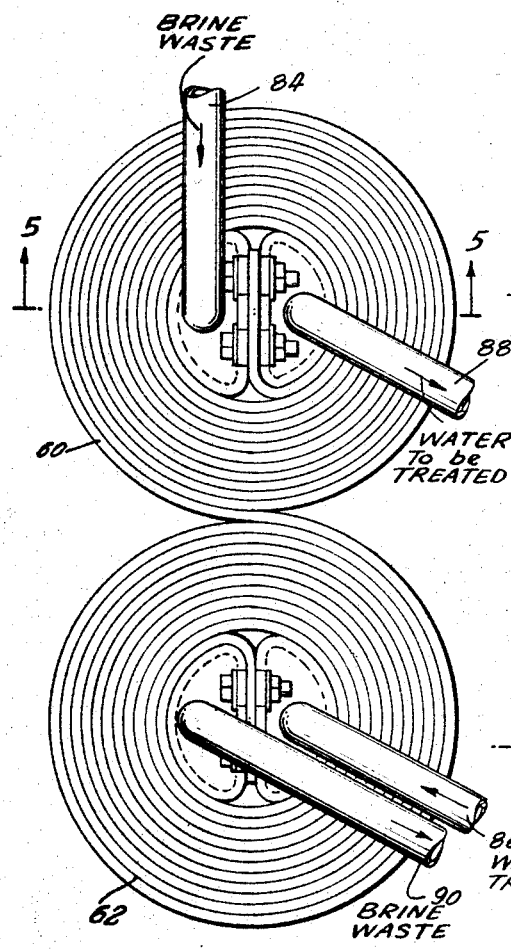
FIGURE 4 is a plan view of a heat transfer device utilized in the apparatus.
Figure 5:
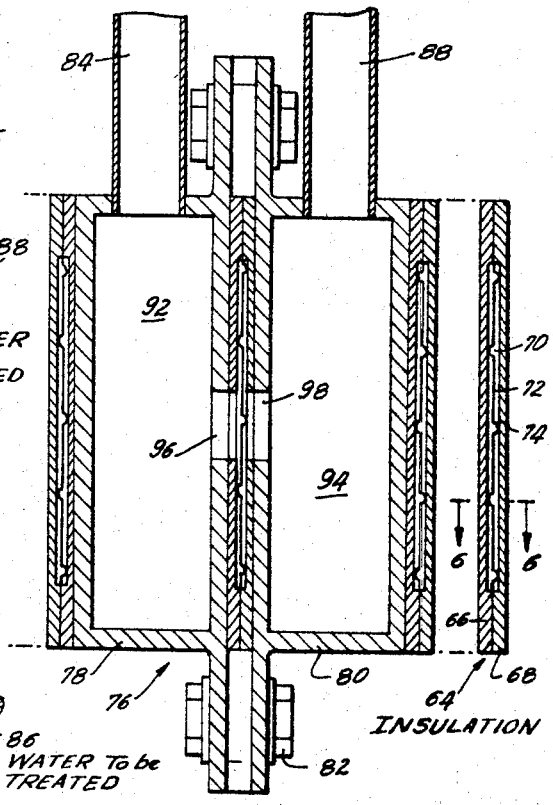
FIGURE 5 is a view of the heat transfer device as seen along the line 5—5 in FIG. 4.
Figure 6:
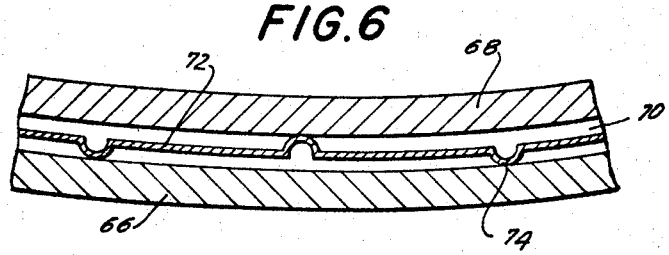
FIGURE 6 is a view of the heat transfer device as seen along the line 6—6 in FIG. 5.

As noted in FIGS. 4 and 5 the sections 60 and 62 are wound in a counter-clockwise and a clockwise manner, respectively, upon a pair of support structures, generally indicated by the numeral 76. The support is in two sections 78 and 80 that are connected by a nut and bolt assembly 82. The ends of the tubing 64 are positively fixed intermediate the sections to define a pair of fluid paths. One fluid path is from conduit 84 to conduit 86, the other from conduit 88 to conduit 90.

Sections 78 and 90 are also provided with a pair of chambers 92 and 94 in which, for example, the non-potable water to be treated and the treated potable water may accumulate prior to its entrance to passageways 96 and 98 and the heat exchange path.

Continuing with the operation, untreated water is conducted through exchanger 56 to the collecting tank 54. While within the tank the water is subjected to a heating process. Firstly, it may be heated by an auxiliary heater 100. Generally the auxiliary heater is only used during the initial starting period, since during this period there is no appreciable outflow from the system to provide partial heating within exchangers 56 and 58. But, once operation has been commenced, the water in collection tank 54 will have been partially heated during its passage through exchangers 56 and 58 by the passage of both treated and untreated water, through the same exchangers, in the opposite direction. Secondly, the untreated water is heated by the exhaust of motor 40 which is passed through the collection tank by conduit 102. As should be obvious, the conduit should be formed of heat conducting material.

Due to the action of exchangers 56 and 58, the exhaust from motor 40, and, if necessary, the auxiliary heater 100 the untreated water within the collection tank will have attained a temperature of approximately 96° C. As seen in FIG. 1 the collection tank and more particularly the space above the surface of the liquid is in communication with the pressurized enclosure by means of a conduit 55. Therefore, a portion of the water within the tank will evaporate so as to partially saturate the dry air within the enclosure or immediately condense and return to the tank. The amount of vapor from the collection tank entering the dry air mass is, in all likelihood, of a negligible amount and therefore, the dry air will be saturated almost entirely by vapor from the untreated water passed into chamber 104 by means of pumps 106, 106′ and conduits 108, 108′.

As discussed above, chamber 104 is maintained at a subatmospheric pressure and actually about 10% below atmospheric pressure.

The untreated water exits from conduits 108 and 108′ at their connection with internal chambers 110. Each of the chambers 110 are mounted on a third heat exchanger 112 and filled with oyster shells 114 or the equivalent, such as shellfish shells, bits of coral, etc. The oyster shells, which are lime carbonates of organic origin, present a large surface area for the untreated water which filters therethrough so as to cause deposition of substantially all the calcium in the untreated water. The deposition of calcium should preferably occur within the chamber of shells rather than on the wall of exchangers 112, upon which evaporation occurs.

Figure 7:
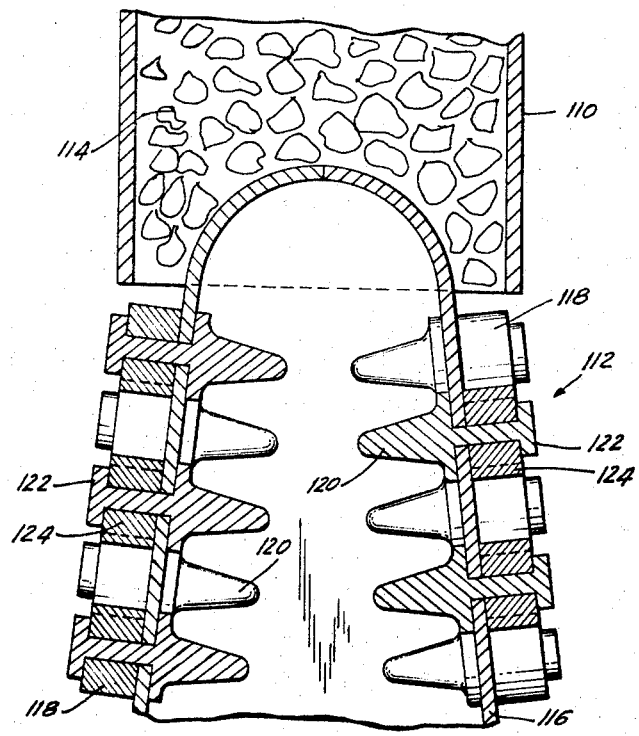
FIGURE 7 is an elevational view in section of a second heat exchange device utilized by the apparatus.

The particular construction of the exchangers 112 may best be seen in FIGS. 7–10. In FIG. 7, the exchanger is shown to be of closed construction comprising an outer wall 116 and a multiplicity of pins 118 that project through the wall. The wall and pins may be cast as one piece.

Figure 8:
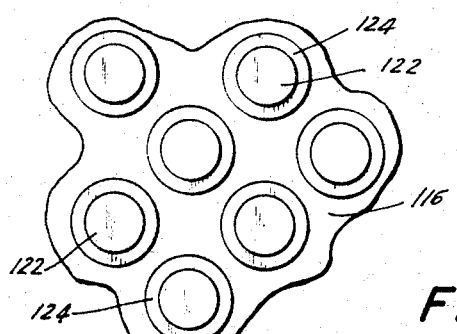
FIGURES 8 and 9 are front views of a plurality of pins mounted within the wall of the second heat exchanger.
Figure 9:
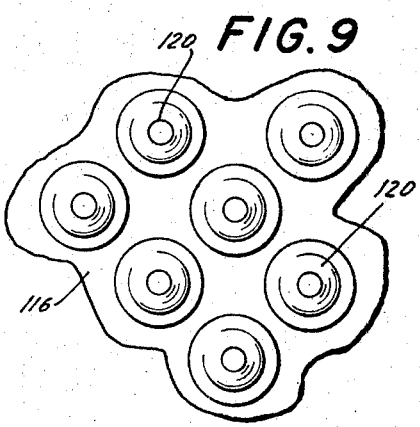
Figure 10:
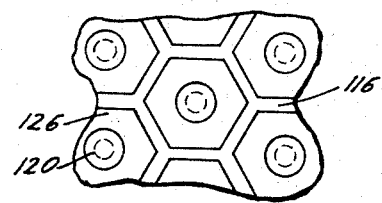
FIGURE 10 is a view similar to FIG. 8 yet showing a second embodiment of pin configuration.

The pins are symmetrically oriented in the wall substantially as shown in FIGS. 8 and 9. FIG. 8 is a showing of the pins as they appear exteriorly of the chamber and FIG. 9 is a showing of the pins as seen interiorly of the chamber. FIG. 10 is a second embodiment showing a further configuration of pin and similar to FIG. 8.

The orientation and construction of the pins is of prime importance. Therefore, within the heat exchanger 112, or the condensation side, the pins are in the form of projecting stalactites 124. The projecting portions function to cause a film of water made up of very tiny drops of water due to condensation to break up so as to form bigger droplets in the gaps between the projections. Thus, as will be explained, the heat transfer obtained by the use of a surface defined by the projection rather than a flat surface is increased by a factor of at least 20 fold.

This may be explained in accordance with the following discussion. By the use of a flat walled surface, a multiplicity of condensate beads will align themselves in side by side relation. Every bead will present a relatively small contacting surface area to the wall at spaced locations, each separated by a gap, many times greater, of air or steam. Knowing that the coefficient of heat transmission for water is about 0.6 and the coefficient of heat transmission for air or steam is only 0.022, the amount of heat transfer may be determined. It is found to be relatively small.

In accordance with the invention, it is found that the heat transfer is increased substantially by the use of the projecting pins within the chamber. As mentioned, the pins cause the film of water to break up to form larger droplets within the valleys thereby presenting a water surface to contact the transfer wall at least 20 times as great as that obtainable with a flat wall. Accordingly, the area of heat transmission for water is increased and the heat transfer to the evaporation side of the heat exchanger 112 is increased by a similar amount.

On the evaporation side, the pins are similarly oriented and provided with base portions 122 that extend from sleeves 124. The orientation of the pins in the wall 116 provide passages and cause the untreated water to circulate therearound in a random fashion so as to be able to efficiently collect the heat required for evaporation and to evaporate into the flowing dry air.

Noting FIG. 8, it will be appreciated that the flow of untreated water from top to bottom, will split and substantially one half of the water will travel on one side of the pin with the other half on the other side of the pin. Upon splitting, the water velocity decreases and thereby acquires heat more rapidly. After passage around the individual pins, the water accelerates only to decelerate upon contacting and splitting at yet another pin. This motion effects the water in a manner so that the vapor is actually pushed or squeezed from the liquid film.

Thus, the orientation and configuration of the pins, both within and without the chamber allows optimum heat transfer whereby the travelling untreated water film attains that quantity of heat necessary for evaporation.

In FIG. 10 the bases 120 of pins 118 are substantially round yet mounted within generally hexagonal sleeves 126. Either form of pin may be employed and each provides substantially similar results.

In the preferred embodiment the heat transfer unit 112 is formed of aluminium containing 99.9% pure metal. While the present invention is not to be limited to the use of pure aluminium the unit must be formed of a material that is inert to sea water and normal contaminants found in unpure water. Further, the material must be one that displays optimum heat transfer capability.

As discussed, the heat of condensation is transferred through the pins 118 so that some portion of the film of untreated water, at approximately 96° C., flowing down the external wall of the exchanger will evaporate. As may be expected, the greatest part of untreated water that is passed to the exchanger 112 is not vaporized. This water is drawn from the enclosure 104 by pump 30 and passes from the system through outlet 48. It will be appreciated that the unvaporized excess has been substantially heated and therefore, as mentioned above, this heat is transferred to the incoming untreated water.

Resuming with the description and operation, the air-vapor mixture is drawn from the chamber 104 by compressor 128. The air-vapor mixture initially enters a pair of centrifuges 130 wherein any water entrained in the air-vapor mixture is separated and passed from the chamber 104 by the path previously described.

The compressor is only schematically shown and includes a conduit 132 connected to its intake port and a conduit 134 connected to its output port (neither of which are shown). In turn, conduit 134 is connected to conduits 136 and 140 thereby connecting the compressor with the chamber portion of heat transfer units 112.

Figure 3:
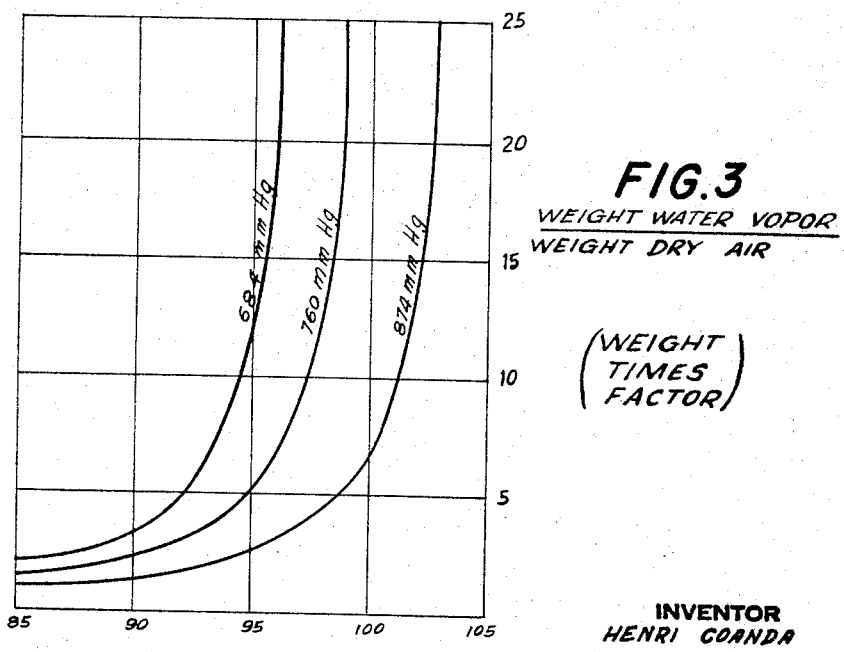
FIGURE 3 is a graph illustrating the proportions of water vapor by weight in a saturated air-vapor mixture at various temperatures and pressures.

The compressor compresses the air-vapor mixture to a pressure in excess of atmospheric pressure, as for example, a pressure approximating 874 mm. Hg. With reference to FIG. 3, it is seen that the temperature of the compressed mixture has increased to a value of approximately 103°–105° C. The compressed mixture at elevated temperature, being exhausted to the exchangers 112, strikes the relatively cooler walls 116 and projections 120 thereby giving up heat and condensing into droplets of pure water, as discussed. Thus, the compressed air initially holding about 25 times its weight of vapor, when subjected to a drop in temperature to the initial temperature, i.e., 96° C., gives up about 90% of the original vapor since it is capable of holding only about 2.5 times its weight in vapor at a pressure of 874 mm. Hg. The condensate is connected at 142.

The condensate which is at approximately 96° C. ±1° C. drawn from the system by pump 36 in a manner similar to the elimination of unvaporized untreated water. During passage through the exchanger 58 a substantial amount of heat is given up to the incoming water, being collected within the holding unit 54, thereby partially heating the same.

As also shown in FIG. 1, the interior of units 112 are connected to the chamber 104 by passages 144. The passages may be provided with bleed valves (not shown) so as to prevent a rapid rise or fall in pressure, both within the units 112 and chamber 104. Thus the passages 144 allow air to return to the chamber 104 wherein it expands. If the quantity of returning air is insufficient to maintain the chamber at the discussed sub-atmospheric pressure, additional air may be supplied through opening 146 connecting chamber 104 to atmosphere.

Therefore, among others, the several objects of the invention as aforementioned are achieved. Obviously, numerous changes in construction could be resorted to without departing from the spirit of the invention, the scope of which is defined in the appended claims.

Having described the invention what is claimed is:

1. A still for use in a water purification system comprising a substantially sealed walled member enclosing a chamber, said wall defining both an outer evaporation surface and an inner condensation surface, said member being disposed within an enclosure having means for introducing substantially dry air and maintained at a first pressure, said outer surface being provided with a continuous flowing film of heated non-potable water whereby due to the heat of condensation a portion of said film will evaporate to substantially saturate said dry air, a plurality of elements supported by and passing through said wall and extending beyond both sides of the wall so as to form part of said surfaces, said member having an air-vapor inlet adapted to be connected to said enclosure through a compressing means wherein said saturated air-vapor mixture is pressurized to a second higher pressure and passed to said condensing surface bounding said chamber, said latter surface being relatively cooler than the temperature of said pressurized mixture thereby causing condensate to form thereon and provide said heat of condensation, said elements adapted to efficiently transmit the condensation heat release to said evaporation surface whereby a portion of said film evaporates to saturate said substantially dry air, a liquid outlet formed in said member for passing said condensate from said chamber, and a gas outlet in said chamber to pass the moisture relieved air to said enclosure.

2. The heat transfer apparatus of claim 1 wherein the wall elements are symmetrically arranged.

3. The transfer apparatus as defined in claim 1 wherein the portion of said elements within said chamber are substantially conical in configuration and project substantially normal to the condensation surface thereby to cause a multiplicity of minute condensation beads to form into a larger condensation droplet between the projections whereby the coefficient of heat transmission to the evaporation surface is increased.

4. The heat transfer apparatus as defined in claim 1 wherein the portion of said elements projecting from the evaporation surface provide a network of passageways for said flowing heated film to cause said film to undergo periods of deceleration during which time it readily acquires the required heat of evaporation and periods of acceleration when the vapor is forced from the film.

5. A heat exchanger for use in a water purification apparatus comprising a pair of elongated members of poor heat conduction capability, said members having a reduced central region that extends along its longitudinal axis to define an open channel, an elongated metallic strip, said members being joined at their edges to support the metallic strip therebetween thereby to provide a pair of flow passages, a support, said members being mounted on said support, and means on said metallic strip to maintain a fixed orientation between said members.

6. An apparatus adapted to be disposed within a substantially sealed and insulated enclosure containing dry air maintained at a first pressure for transforming non-potable water to potable drinking water comprising a heated passage, liquid conveying means for non-potable water; heat transfer means within said enclosure in the form of a closed chamber having an air-vapor inlet, a potable liquid outlet and a gas outlet; pumping means for drawing non-potable water from a source and passing said water through said non-potable liquid passage means so that said non-potable water will be heated and thereafter flow in a thin film over an evaporation surface defined by the chamber outer wall thereby to convert a portion of said film into vapor form by heat conduction through said wall to substantially saturate said dry air mass; a compressor; said compressor having an input port connected to said enclosure for withdrawing therefrom and pressurizing the substantially saturated air-vapor mixture to a second pressure in excess of said first pressure; means connecting the output of said compressor with said air-vapor inlet of the heat transfer means thereby to pass said pressurized air-vapor mixture into said chamber and along the relatively cooler internal wall thereof so that said vapor condenses into droplets of potable water and the heat of condensation provides the necessary heat to said evaporation surface to transform said thin film of non-potable water into vapor; second pumping means for withdrawing said potable condensate from said chamber potable liquid outlet through a potable liquid passage means in heat exchange with said non-potable passage means for collection, and an air passageway for conveying the spent moisture-relieved air from the chamber into the enclosure.

7. The apparatus of claim 6 wherein said heated passage, liquid conveying means and said potable liquid passage means include a heat exchanger including a pair of elongated members of poor heat conduction capability, said elongated members having a reduced central region that extends along the longitudinal axis to define an open channel, an elongated metallic strip, said elongated members being joined at their edge to support the metallic strip therebetween thereby to provide a pair of flow passages, a support, said members being mounted on said support, and means on said metallic strip to maintain a fixed orientation between said members.

8. The apparatus as defined in claim 6 wherein said heated passage, liquid conveying means and said potable liquid passage means include a heat exchanger for partially heating said non-potable water by the transfer of heat from said potable condensate, a collecting device within said heated passage, liquid conveying means wherein the non-potable water is further heated to a temperature at which evaporation may occur.

9. The apparatus as defined in claim 8 comprising a second heated passage, liquid conveying means for non-potable water, and third pumping means adapted to draw non-potable water from said source and pass said water through said second liquid passage means for non-potable water so that said non-potable water will be heated and thereafter flow in a thin film over said evaporation surface.

10. The apparatus as defined in claim 9 comprising a liquid passage means for unvaporized non-potable water passage means being connected at one end to said enclosure, said second non-potable passage means and said unvaporized non-potable water passage means including a second heat exchanger for partially heating said non-potable water in said second non-potable water passage means by heat exchange from said unvaporized non-potable water, said second liquid passage means including said collecting device, and fourth pumping means for withdrawing said unvaporized non-potable water from said enclosure.

11. The apparatus defined in claim 6 wherein said heat transfer means comprises a wall portion bounding said chamber and defining both an outer evaporation surface and an inner condensation surface, said transfer means being disposed within said enclosure of dry air maintained at a first pressure, said outer surface being provided with a continuous flowing film of heated non-potable water from said non-potable water passage means whereby due to the heat of condensation a portion of said film will evaporate to substantially saturate said dry air, and a plurality of elements supported by and passing through said wall and extending beyond both sides of the wall so as to form part of said surfaces, said air-vapor inlet connected to said enclosure through said compressing means wherein said saturated air-vapor mixture is pressurized to a second higher pressure and passed to said condensing surface bounding said chamber, said latter surface being relatively cooler than the temperature of said pressurized mixture thereby causing condensate to form thereon, said elements providing efficient transmission of condensation heat release to said evaporation surface whereby a portion of said film evaporates to saturate said dry air.

12. The apparatus of claim 11 wherein said wall elements are symmetrically arranged.

13. The transfer apparatus as defined in claim 11 wherein the portion of said elements within said chamber are substantially conical in configuration and project substantially normal to the condensation surface thereby to cause a multiplicity of minute condensation beads to form into a larger condensation droplet between the projections whereby the coefficient of heat transmission to the evaporation surface is increased.

14. The heat transfer apparatus as defined in claim 11 wherein the portion of said elements projecting from the evaporation surface provide a network of passageways for said flowing heated film to cause said film to undergo periods of deceleration during which time it readily acquires the required heat of evaporation and periods of acceleration when the vapor is forced from the film.

References Cited

UNITED STATES PATENTS

| | | | |
|---|---|---|---|
| 2,368,665 | 2/1945 | Kohman et al. | 202—49 |
| 2,793,988 | 5/1957 | Latham et al. | 203—11 X |
| 3,161,574 | 12/1964 | Elam | 203—11 X |
| 3,244,601 | 4/1966 | Diedrich | 202—236 |
| 3,289,752 | 12/1966 | Staub | 165—115 |
| 3,312,600 | 4/1967 | Morton | 202—177 X |
| 3,326,266 | 6/1967 | Braithwaite et al. | 203—26 X |
| 3,351,119 | 11/1967 | Rosenblad | 159—13 |
| 3,340,186 | 9/1967 | Weyl | 203—11 X |

FOREIGN PATENTS 46,710　2/1918　Sweden.

NORMAN YUDKOFF, *Primary Examiner.*

J. SOFER, *Assistant Examiner.*